US012754777B2

(12) United States Patent
Mohanty et al.

(10) Patent No.: US 12,754,777 B2
(45) Date of Patent: Oct. 6, 2026

(54) METHOD AND SYSTEM FOR OPTIMIZING RESOURCE REQUIREMENTS ON A DISTRIBUTED PROCESSING PLATFORM

(71) Applicant: JPMorgan Chase Bank, N.A., New York, NY (US)

(72) Inventors: Swastik Mohanty, Bhubaneswar (IN); Nilesh Sinha, New Delhi (IN); Archita Arora, Ajmer (IN); Hemant Rout, Cuttack (IN); Srileka Vijayakumar, Bengaluru (IN); Rakesh Kumar Kashyap, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 603 days.

(21) Appl. No.: 18/208,575

(22) Filed: Jun. 12, 2023

(65) Prior Publication Data

US 2024/0362079 A1 Oct. 31, 2024

(30) Foreign Application Priority Data

Apr. 29, 2023 (IN) ............................. 202311030892

(51) Int. Cl.
*G06F 9/50* (2006.01)

(52) U.S. Cl.
CPC .......... *G06F 9/5077* (2013.01); *G06F 9/5072* (2013.01)

(58) Field of Classification Search
CPC ..................................................... G06F 9/5077
USPC ........................................................... 718/104
See application file for complete search history.

(56) References Cited

U.S. PATENT DOCUMENTS

| | | | | |
|---|---|---|---|---|
| 8,259,315 B2 * | 9/2012 | Ebuchi | G06F 3/1243 719/321 |
| 11,954,098 B1 * | 4/2024 | Hron, II | G06F 16/285 |
| 2023/0169263 A1 * | 6/2023 | Jose | G06F 9/541 715/224 |

OTHER PUBLICATIONS

Class Note, Oklahoma State University, 2020 (Year: 2020).*

* cited by examiner

*Primary Examiner* — Charlie Sun
(74) *Attorney, Agent, or Firm* — GREENBLUM & BERNSTEIN, P.L.C.

(57) ABSTRACT

A method and a system for optimizing at least one resource requirement on a distributed processing platform are disclosed. The method includes receiving at least one text file based on a user input and generating an output file based on the at least one text file. Next, the method includes identifying at least one operator in the output file and applying at least one rule to the at least one operator. Next, the method includes scanning the at least one rule that is applied to the at least one operator. Next, the method includes recommending at least one change in the at least one rule. Thereafter, the method includes generating at least one updated output file based on the recommendation of the at least one change in the at least one rule.

15 Claims, 5 Drawing Sheets

METHOD AND SYSTEM FOR OPTIMIZING RESOURCE REQUIREMENTS ON A DISTRIBUTED PROCESSING PLATFORM

CROSS-REFERENCE TO RELATED APPLICATIONS

This application claims priority benefit from Indian Application No. 202311030892, filed on Apr. 29, 2023 in the India Patent Office, which is hereby incorporated by reference in its entirety.

BACKGROUND

Field of the Disclosure

This technology generally relates to methods and systems for optimizing resource requirements on a distributed processing platform, and more particularly to methods and systems for optimizing resource requirements in Apache Spark and recommending optimized configuration and solutions for operational challenges in the Apache Spark.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as an admission of the prior art.

As is generally known, organizations rely upon large volumes of data for various decisions related to consumer behavior and associated organizational strategy. Distributed processing platforms are used to handle data as the platforms offer numerous advantages like immutability of data, and fault tolerance as the data is stored across nodes in a network cluster. The system provides high fault tolerance due to the capability to handle the failure of any working node in the network cluster.

The major problems faced by organizations in working with the distributed processing platforms include resource estimation and management, configuration optimization, identification of root-cause for the failure of the configuration, and the like. Due to parallelized nature of the distributed computing in the distributed processing platforms, distributed computing comes at an unavoidable communication overhead attributable to the time required in data transfer to the various nodes in the cluster. The applications relied upon by the organization face operational challenges including performance issues, excessive data shuffles, memory leakages, misconfigurations, and the like. Data shuffling between distributed clusters of nodes assists in implementing large-scale machine-learning algorithms. At the same time, excessive data shuffles increase the communication overhead leading to an adverse impact on the response time of the distributed processing platform. The time required to transfer data to various nodes in the cluster is therefore an important factor in the performance of the distributed computing environments.

Hence, in view of these and other existing limitations, there arises an imperative need to provide an efficient solution to overcome the above-mentioned limitations and to provide a method and system for optimizing at least one resource requirement on a distributed processing platform.

SUMMARY

The present disclosure, through one or more of its various aspects, embodiments, and/or specific features or sub-components, provides, inter alia, various systems, servers, devices, methods, media, programs, and platforms for optimizing resource requirements on a distributed processing platform.

According to an aspect of the present disclosure, a method for optimizing at least one resource requirement on a distributed processing platform is disclosed. The method is implemented by at least one processor. The method includes receiving, by the at least one processor, at least one text file based on a user input. Next, the method includes generating, by the at least one processor, an output file based on the at least one text file. The output file comprises an explain plan associated with the at least one text file. Next, the method includes identifying, by the at least one processor using a trained model, at least one operator in the output file. Next, the method includes applying, by the at least one processor, at least one rule to the at least one operator, wherein the at least one rule for the at least one operator is retrieved from at least one rule database. Next, the method includes scanning, by the at least one processor, the at least one rule that is applied to the at least one operator. Next, the method includes recommending, by the at least one processor using the trained model, at least one change in the at least one rule based on the scanning of the at least one rule. Thereafter, the method includes generating, by the at least one processor, at least one updated output file based on the recommendation of the at least one change in the at least one rule.

In accordance with an exemplary embodiment, each of the at least one text file includes a Spark code.

In accordance with an exemplary embodiment, the at least one rule database includes a plurality of rules defined for a plurality of operators.

In accordance with an exemplary embodiment, the at least one change in the at least one rule is recommended for an optimal execution of the received text file.

In accordance with an exemplary embodiment, the method further includes storing, by the at least one processor, the at least one updated output file in a database.

In accordance with an exemplary embodiment, the method further includes executing, by the at least one processor, the at least one updated output file. The execution of the at least one updated output file is done by analyzing, using the trained mode, the at least one updated output file; identifying at least one configuration associated with the distributed processing platform based on the analysis of the at least one updated output file; recommending the at least one identified configuration for the execution of the at least one updated output file; and executing the at least one updated output file using the at least one identified configuration.

According to another aspect of the present disclosure, a computing device configured to implement an execution of a method for optimizing at least one resource requirement on a distributed processing platform is disclosed. The computing device includes a processor; a memory; and a communication interface coupled to each of the processor and the memory. The processor may be configured to receive, via the communication interface, at least one text file based on a user input. Next, the processor may be configured to generate an output file based on the at least one text file. The output file includes an explain plan associated with the at least one text file. Next, the processor may be configured to identify, using a trained model, at least one operator in the output file. Next, the processor may be configured to apply at least one rule to the at least one operator. The at least one rule for the at least one operator is retrieved from at least one rule database. Next, the processor may be configured to scan the at least one rule that is applied to the at least one operator. Next, the processor may be configured to recommend, using the trained model, at least one change in the at least one rule based on the scan of the at least one rule. Thereafter, the processor may be configured to generate at least one updated output file based on the recommendation of the at least one change in the at least one rule.

In accordance with an exemplary embodiment, each of the at least one text file includes a Spark code.

In accordance with an exemplary embodiment, the at least one rule database includes a plurality of rules defined for a plurality of operators.

In accordance with an exemplary embodiment, the at least one change in the at least one rule is recommended for an optimal execution of the received text file.

In accordance with an exemplary embodiment, the processor may be configured to store the at least one updated output file in a database.

In accordance with an exemplary embodiment, to execute the at least one updated output file, the processor may be further configured to analyze, using the trained model, the at least one updated output file; identify at least one configuration associated with the distributed processing platform based on the analysis of the at least one updated output file; recommend the at least one identified configuration for the execution of the at least one updated output file; and execute the at least one updated output file using the at least one identified configuration.

According to yet another aspect of the present disclosure, a non-transitory computer-readable storage medium storing instructions for optimizing at least one resource requirement on a distributed processing platform is disclosed. The instructions include executable code which, when executed by a processor, may cause the processor to receive, via a communication interface, at least one text file based on a user input; generate an output file based on the at least one text file, wherein the output file comprises an explain plan associated with the at least one text file; identify, using a trained mode, at least one operator in the output file; apply at least one rule to the at least one operator, wherein the at least one rule for the at least one operator is retrieved from at least one rule database; scan the at least one rule that is applied to the at least one operator; recommend, using the trained model, at least one change in the at least one rule based on the scan of the at least one rule; and generate at least one updated output file based on the recommendation of the at least one change in the at least one rule.

In accordance with an exemplary embodiment, each of the at least one text file includes a Spark code.

In accordance with an exemplary embodiment, the at least one rule database includes a plurality of rules defined for a plurality of operators.

In accordance with an exemplary embodiment, the at least one change in the at least one rule is recommended for an optimal execution of the received text file.

In accordance with an exemplary embodiment, the executable code when executed causes the processor to store the at least one updated output file in a database.

In accordance with an exemplary embodiment, to execute the at least one updated output file, the executable code when executed causes the processor to analyze, using the trained model, the at least one updated output file; identify at least one configuration associated with the distributed processing platform based on the analysis of the at least one updated output file; recommend the at least one identified configuration for the execution of the at least one updated output file; and execute the at least one updated output file using the at least one identified configuration.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
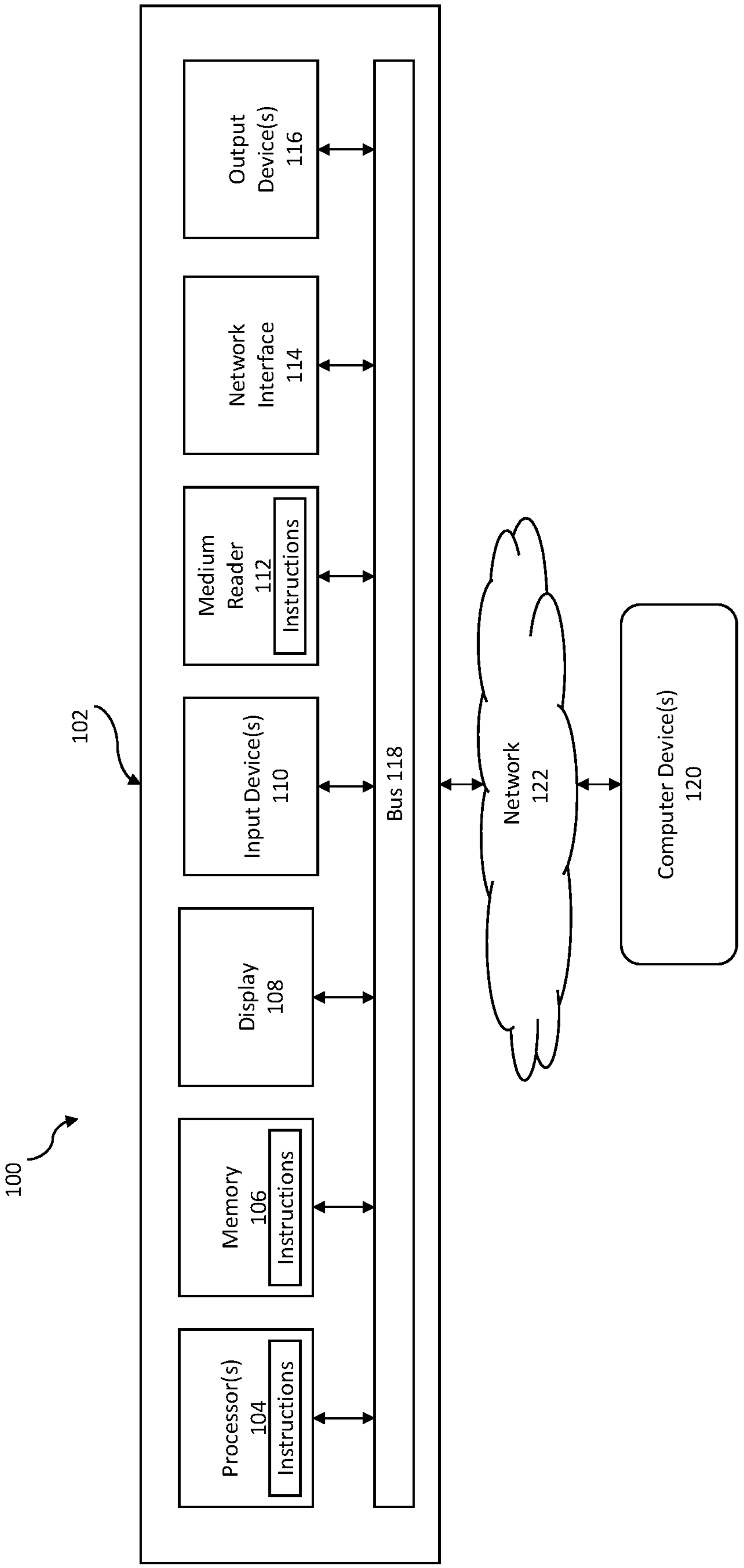
FIG. 1 illustrates an exemplary computer system for optimizing at least one resource requirement on a distributed processing platform in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections and the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the disclosure. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with performance management and configuration optimization in distributed computing over the distributed processing platforms, the present disclosure provides a method and system for optimizing at least one resource requirement on the distributed processing platform. The system first receives at least one text file based on a user input. In an example, the at least one text file includes an Apache Spark code submitted by the user using a user input device. Next, the system generates an output file based on the at least one text file. The output file comprises an explain plan associated with the at least one text file. In an example, the system generates an explain plan comprising a "Logical Explain Plan Output" and a "Physical Explain Plan Output" for the Apache Spark code. Next, the system identifies at least one operator in the output file. In an example, the operator identified is an "aggregate" operator in the output file. Next, the system applies at least one rule to the at least one identified operator, wherein the at least one rule for the at least one operator is retrieved from at least one rule database. In an example, the system stores a plurality of rules associated with a plurality of operators in the at least one rule database. In another example, the at least one rule is associated with optimum performance and configuration of resources in distributed computing and is based on statistical analysis of the configuration and resource management associated with the at least one operator. Next, the system scans the at least one rule that is applied to the at least one operator for any performance issues and recommends at least one change in the applied at least one rule for an optimal execution of the at least one received text file, e.g., the Apache Spark code. In an example, the at least one recommendation is stored in a recommendation database, and for at least one rule there is at least one recommendation stored in the recommendation database. In another example, the system is customized to recommend at least one change in the at least one rule applied to the at least one operator using the trained model. Thereafter, the system generates at least one updated output file based on the recommendation of the at least one change in the at least one rule. In an example, the updated output file corresponds to an updated Spark code received after incorporating the at least one change recommended by the trained model. In addition, the updated output files includes the information associated with the at least applied rule, at least one recommendation, type of recommendation, text description associated with the at least one recommendation, and the like.

In an example, the identified operator is a "read" operator. The applied at least one rule for the identified "read" operator is "sxor_read_multiple_scan". The at least one rule is applied to find out if the source dataset is read multiple times. The said rule is scanned for any performance issues and recommendations are provided to the user. The at least one recommendation for the applied rule "sxor_read_multiple_scan" includes, but is not limited to, "read_only_once" rule, "sel_cols_only" rule, and "native parquet" rule. The system additionally may rank the recommendations. In an example, "read only once" is assigned with rank 1, "sel_cols_only" is assigned with rank 2, and "native parquet" is assigned with rank 3 based on the preference of the recommendations for the applied at least one rule. The recommendations are based on the scanning of the applied rule for a performance issue where the source dataset is read multiple times. In an example, the performance issue is avoided by the implementation of the recommendation with the assigned rank 1. The system may further be customized to provide recommendation text with the at least one recommendation to the user. In an example, the recommendation text corresponding to "read_only_once" recommendation may be provided to the user as "the recommendation uses cache memory to store the data thereby avoiding the need to read the source dataset multiple times". The system is further configured to generate the at least one updated output file by replacing the at least one applied rule with the at least one recommended rule for the optimal execution of the at least one received text file.

In a non-limiting exemplary embodiment, the system stores the updated output file in a database wherein data associated with the updated output file is used for performing analytics in the form of visual representation. In an example, the visual representation includes but is not limited to, tabular and graphical representations of the analyzed data.

In an example, at least one entity (e.g., the user) provides the Apache Spark code to the system. In general, the Apache Spark code needs optimization and efficient resource management in the distributed computing. However, this process is complex and requires expertise and anticipation of resource requirements and configuration. Thus, the conventionally available solutions are complicated and not recommended. Therefore, as per the solution of the present disclosure, the system is configured to optimize the Spark code received based on the user input. The system is further capable of recommending updated Apache Spark code to the user after applying at least one recommendation using machine learning (ML) techniques. The system recommends optimum configuration after the execution of the code and ensures efficient utilization of computational resources.

Therefore, the present disclosure aids in achieving the optimum utilization of computational resources in the distributed processing platform. The communication overhead associated with data transfer to the distributed machines in the distributed computing environment is minimized, by the implementation of the system as disclosed. The implementation of features of the present disclosure results in achieving better efficiency and performance owing to various factors. In an example, the factors include but are not limited to reducing communication overheads, avoiding operational challenges associated with excessive data shuffles, memory leakages, and misconfiguration of computational resources in the distributed computing environment.

FIG. 1 is an exemplary system for use in accordance with the embodiments described herein. The system 100 is generally shown and may include a computer system 102 which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, at least one text file includes an Apache Spark code received based on a user input.

As used herein, at least one rule database includes a plurality of rules defined for a plurality of operators. The plurality of rules stored in the at least one rule database is associated with optimum performance and configuration of resources in distributed computing based on statistical analysis of the configuration and resource management associated with at least one operator.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a Display Unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may include but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for optimizing the at least one resource requirement on the distributed processing platform.

Figure 2:
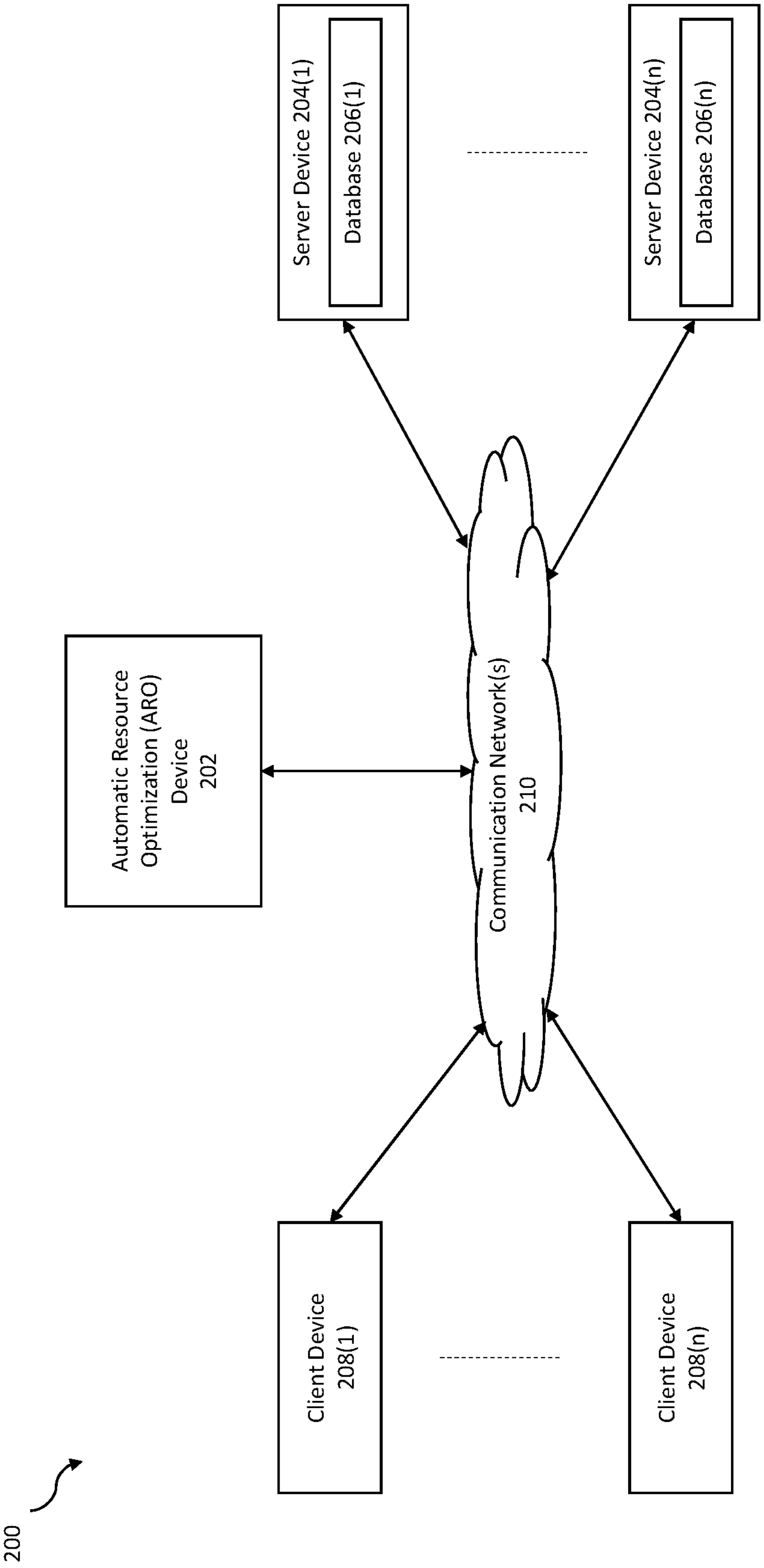
FIG. 2 illustrates an exemplary diagram of a network environment for optimizing at least one resource requirement on a distributed processing platform in accordance with an exemplary embodiment.

Referring to FIG. 2, a schematic of an exemplary network environment 200 for implementing a method for optimizing at least one resource requirement on a distributed processing platform is illustrated. In an exemplary embodiment, the method is executable on any networked computer platform, such as, for example, a personal computer (PC).

The method for optimizing the at least one resource requirement on the distributed processing platform may be implemented by an Automatic Resource Optimization (ARO) device 202. The ARO device 202 may be the same or similar to the computer system 102 as described with respect to FIG. 1. The ARO device 202 may store one or more applications that can include executable instructions that, when executed by the ARO device 202, cause the ARO device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the ARO device 202 itself, may be located in the virtual server(s) running in a cloud-based computing environment rather than being tied to one or more specific physical network computing devices. Also, the application(s) may be running in one or more virtual machines (VMs) executing on the ARO device 202. Additionally, in one or more embodiments of this technology, virtual machine(s) running on the ARO device 202 may be managed or supervised by a hypervisor.

In the network environment 200 of FIG. 2, the ARO device 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the ARO device 202, such as the network interface 114 of the computer system 102 of FIG. 1, operatively couples and communicates between the ARO device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARO device 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides several advantages including methods, non-transitory computer-readable media, and ARO devices that efficiently implement the method for optimizing the at least one resource requirement on the distributed processing platform.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The ARO device 202 may be a standalone device or integrated with one or more other devices or apparatuses, such as one or more of the server devices 204(1)-**204(*n*), for example. In one particular example, the ARO device 202 may include or be hosted by one of the server devices 204(1)-204(*n*), and other arrangements are also possible. Moreover, one or more of the devices of the ARO device 202** may be in a same or a different communication network including one or more public, private, or cloud-based networks, for example.

The plurality of server devices 204(1)-**204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. In an example, the server devices 204(1)-204(*n*) may process requests received from the ARO device 202 via the communication network(s) 210** according to the Hypertext Transfer Protocol (HTTP)-based and/or JavaScript Object Notation (JSON) protocol, for example, although other protocols may also be used.

The server devices 204(1)-**204(*n*) may be hardware or software or may represent a system with multiple servers in a pool, which may include internal or external networks. The server devices 204(1)-204(*n*) hosts the databases or repositories 206(1)-206(*n*)** that are configured to store data that relates resolution of production problems, storage planning, schedule planning, datasets related to the prediction of resolution to production problems, machine learning models.

Although the server devices 204(1)-**204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*)** operates to manage and/or otherwise coordinate operations of the other network computing devices.

The server devices 204(1)-**204(*n*)** may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-**208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the ARO device 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary embodiment, at least one client device 208** is a wireless mobile communication device, e.g., a smartphone.

The client devices 208(1)-**208(*n*) may run interface applications, such as standard web browsers or standalone client applications, which may provide an interface to communicate with the ARO device 202 via the communication network(s) 210 in order to communicate user requests and information. The client devices 208(1)-208(*n*)** may further include, among other features, a display device, such as a display screen or touchscreen, and/or an input device, such as a keyboard, for example.

Although the exemplary network environment 200 with the ARO device 202, the server devices 204(1)-**204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARO device 202, the server devices 204(1)-**204(*n*), or the client devices 208(1)-208(*n*), for example, may be configured to operate as virtual instances on the same physical machine. In other words, one or more of the ARO device 202, the server devices 204(1)-204(*n*), or the client devices 208(1)-208(*n*) may operate on the same physical device rather than as separate devices communicating through communication network(s) 210. Additionally, there may be more or fewer ARO devices 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
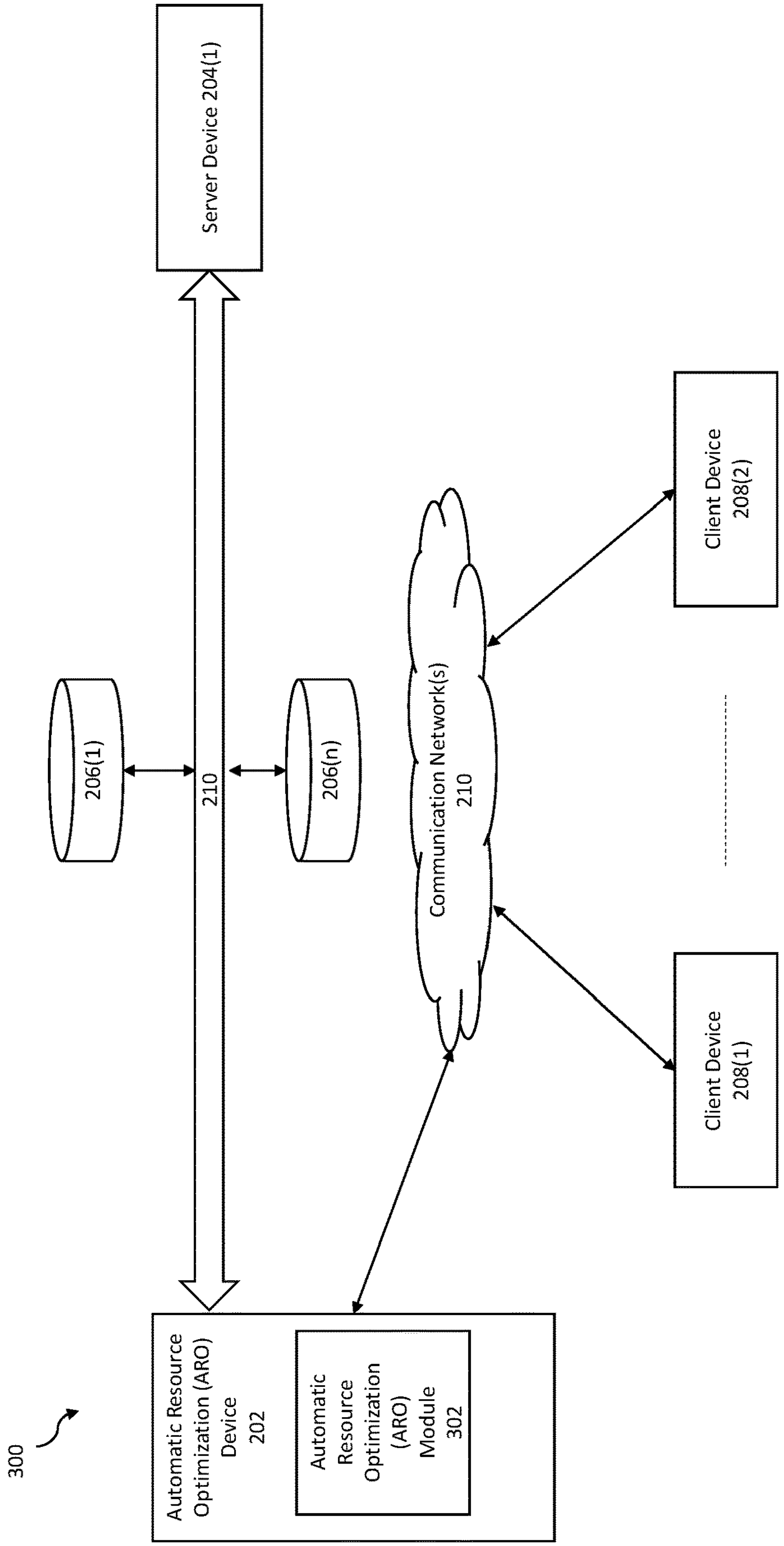
FIG. 3 illustrates an exemplary system for optimizing at least one resource requirement on a distributed processing platform in accordance with an exemplary embodiment.

FIG. 3 illustrates an exemplary system for implementing a method for optimizing at least one resource requirement on a distributed processing platform in accordance with an exemplary embodiment. As illustrated in FIG. 3, according to exemplary embodiments, the system 300 may comprise an ARO device 202 including an Automatic Resource Optimization (ARO) module 302 that may be connected to a server device 204(1) and one or more repository from the repositories 206(1) . . . **206(*n*) via a communication network 210**, but the disclosure is not limited thereto.

The ARO device 202 is described and shown in FIG. 3 as including the ARO module 302, although it may include other rules, policies, modules, databases, or applications, for example. As will be described below, the ARO module 302 is configured to implement a method for optimizing resource requirements on a distributed processing platform.

An exemplary process 300 for implementing a mechanism for optimizing resource requirements on a distributed processing platform by utilizing the network environment of FIG. 2 is shown as being executed in FIG. 3. Specifically, a first client device 208(1) and a second client device 208(2) are illustrated as being in communication with ARO device 202. In this regard, the first client device 208(1) and the second client device 208(2) may be "clients" of the ARO device 202 and are described herein as such. Nevertheless, it is to be known and understood that the first client device 208(1) and/or the second client device 208(2) need not necessarily be "clients" of the ARO device 202, or any entity described in association therewith herein. Any additional or alternative relationship may exist between either or both of the first client device 208(1) and the second client device 208(2) and the ARO device 202, or no relationship may exist.

Further, the ARO device 202 is illustrated as being able to access one or more repositories 206(1) . . . **206(*n*). The ARO module 302** may be configured to access these repositories/databases for implementing a method for optimizing resource requirements on a distributed processing platform.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the ARO device 202 via broadband or cellular communication. Of course, these embodiments are merely exemplary and are not limiting or exhaustive.

Figure 4:
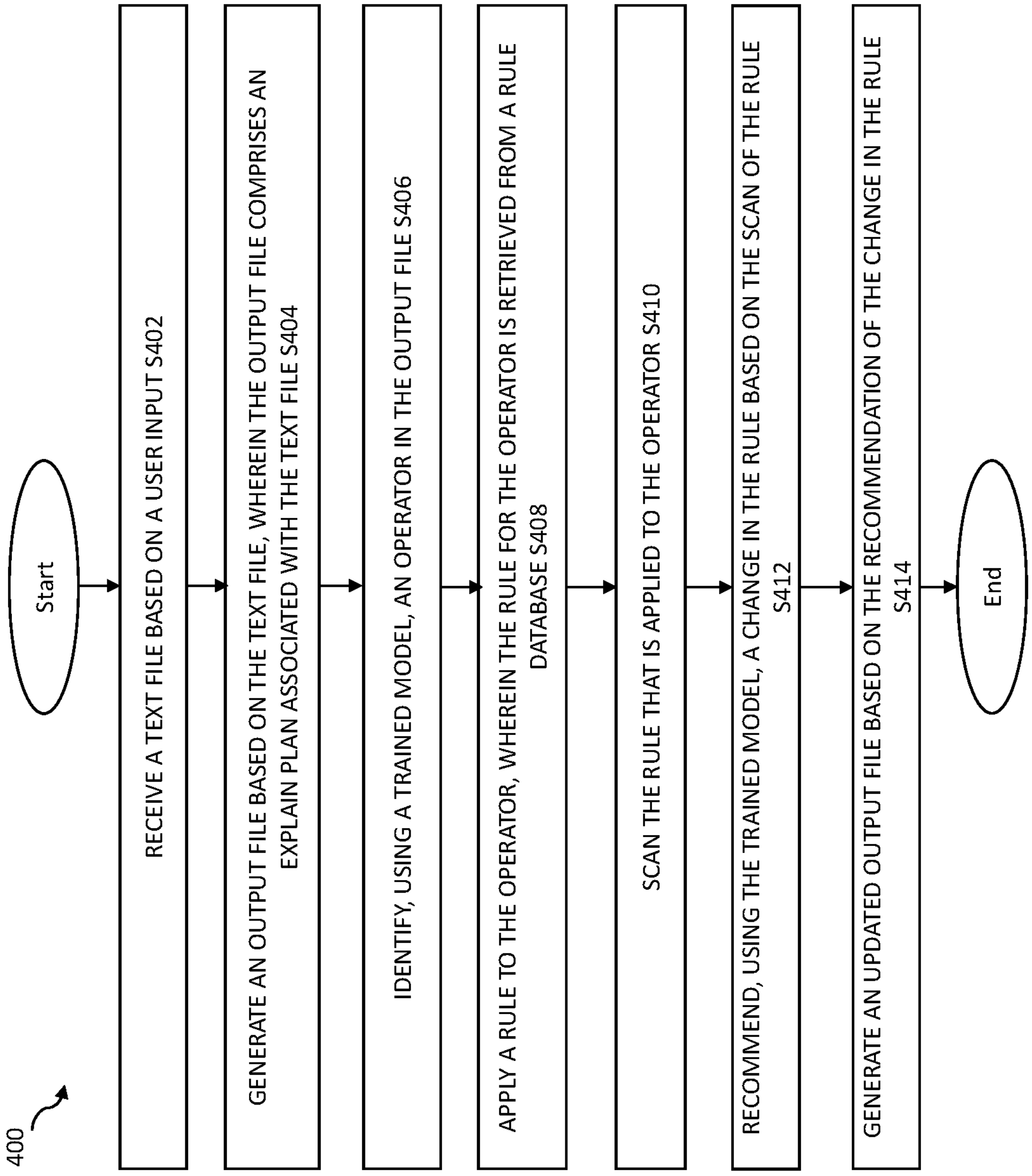
FIG. 4 illustrates an exemplary method flow diagram for optimizing at least one resource requirement on a distributed processing platform in accordance with an exemplary embodiment.

Referring to FIG. 4, an exemplary method 400 is shown for optimizing at least one resource requirement on a distributed processing platform in accordance with an exemplary embodiment. As shown in FIG. 4, the method begins following a need for resource management and configuration optimization in a distributed computing over the distributed processing platform.

At step S402, the method includes receiving, by the at least one processor 104 via a communication interface 114, at least one text file based on a user input. The input may be provided using at least one input device 110, such as a keyboard, a touch-sensitive input screen or pad, a speech input, a mouse, a remote-control device having a wireless keypad. In a non-limiting exemplary embodiment, each of the at least one text file includes a Spark code. In an example, the user may correspond to a developer who is looking for at least one recommendation on the Spark code for an optimized execution of the Spark code. In another example, the Spark code may be received directly from a system, a platform, or a device associated with the code developing team.

At step S404, the method includes generating, by the at least one processor 104, an output file based on the at least one text file, wherein the output file includes an explain plan associated with the at least one text file. In an example, the explain plan is usually divided into a "Logical Explain Plan Output" and a "Physical Explain Plan Output".

In a non-limiting exemplary embodiment, the "Logical Explain Plan Output" includes "Parsed Logical Plan", "Analyzed Logical plan", and the "Optimized Logical Plan". The "Logical Explain Plan Output" is responsible for providing the expected output on the execution of the operations based on the operators in the input Spark code. In an example, the operations are based on the execution of operators that includes but is not limited to "join", "groupBy", "filter". The Logical Explain Plan Output includes the step of parsing the dataset, analyzing the dataset, and then generating the optimized logical plan as an output. In an example, the Logical Explain Plan Output includes the step of resolving the issues related to columns/attributes for the tabular datasets and then generating the optimized logical plan with all the accurate input columns/attributes related to the spark code. Thereafter, "Physical Explain Plan Output" is generated from the "Optimized Logical Plan". The "Physical Explain Plan Output" is responsible for finalizing the join type between different datasets. The "Physical Explain Plan Output" is additionally responsible for deciding the sequence of execution of operators like "filter", "where", "groupBy" used in the received input Spark code. In an example, the "Physical Explain Plan Output" is used for determining the manner of joining the plurality of datasets scattered across the nodes in the distributed computing environment. The "Physical Explain Plan Output" is therefore responsible for better and efficient optimization of resources and recommending optimum configuration for the received input Spark code.

At step S406, the method includes identifying, by the at least one processor 104 using a trained model, at least one operator in the output file. In an example, the at least one operator identified in the output file may include operators like "filter", "aggregate", "sort", "exchange", and/or "read". In a non-limiting exemplary embodiment, the method further includes summarizing, by the at least processor, the at least one identified operator with a description of the corresponding operator. In an example, the processor may find a "sort" operator in the output file which is summarized as "operator for spark data sorting".

At step S408, the method includes applying, by the at least one processor 104, at least one rule to the at least one operator, wherein the at least one rule for the at least one operator is retrieved from at least one rule database. In a non-limiting exemplary embodiment, the at least one rule database includes a plurality of rules defined for a plurality of operators. The plurality of rules stored in the at least one rule database is defined to perform best practices for resource management and optimization in the distributed computing environment. The best practice as stored in the at least one rule database is identified based on the statistical analysis of performance associated with the application of the rule to the identified at least one operator.

At step S410, the method includes scanning, by the at least one processor 104, the at least one rule that is applied to the at least one operator. In an example, the at least one rule applied to the at least one operator is scanned, using a recommendation engine, to come up with at least one recommendation that may be used to optimize the performance at the time of execution of the text file.

At step S412, the method includes recommending, by the at least one processor 104 using the trained model, at least one change in the at least one rule based on the scanning of the at least one rule. In an example, there may be at least one recommendation associated with each of the at least one rule applied to the at least one identified operator. In a non-limiting exemplary embodiment, the at least one change in the at least one rule may be applied directly, by the at least one processor, to the at least one received text file to generate an updated output file. For example, the user may be recommended, using the trained mode, with the at least one change or suggestion to be required in the Spark code to optimize the Spark code and then the user may take a decision accordingly. In a non-limiting embodiment, the trained model corresponds to either a supervised or an unsupervised machine learning model. In an exemplary embodiment, machine learning may include supervised learning algorithms such as, for example, k-medoids analysis, regression analysis, decision tree analysis, random forest analysis, k-nearest neighbors' analysis, logistic regression analysis, K-fold cross-validation analysis, balanced class weight analysis, and the like.

At step S414, the method includes generating, by the at least one processor 104, the at least one updated output file based on the recommendation of the at least one change in the at least one rule. In an exemplary embodiment, the method further includes storing, by the at least one processor, the at least one updated output file in a database. In an example, the updated output file consists of the combination of rules applied, recommendation type, and the corresponding recommendations applied to the at least one text file. The updated output file is stored in the database and is used for analytics. The results of the analytics performed on the at least one updated output file is displayed in the form of a tabular or graphical representation. In addition, the results of the analytics are used for the recommendation of at least one relevant rule or change in the code. In another example, the dataset stored in the database is stored as JSON files.

In an embodiment, the method as disclosed is divided into a pre-execution and a post-execution stage associated with the received at least one text file e.g., Apache Spark code. In the pre-execution stage, the method as disclosed herein optimizes the received code by recommending the at least one change associated with the at least one rule in the received code. The method as disclosed herein provides flexibility by generating the explain plan to handle multiple scenarios and accordingly recommend changes to the applied at least one rule. In the post-execution stage, the method disclosed herein optimizes the configuration of the computational resources in the distributed computing environment. The method recommends the optimized resource configuration related to the memory and the number of cores required in the master and worker nodes of the distributed computing environment. The post-execution stage further refines the recommendations, thereby reducing the time and efforts required for optimizing at least one resource requirement on a distributed processing platform like Apache Spark.

In another non-limiting embodiment, the method includes executing the at least one updated output file. To execute the at least one updated output file, the method includes analyzing, by the at least one processor 104 using the trained model, at least one updated output file. Next, the method includes identifying, by the at least one processor 104 at least one configuration associated with the distributed processing platform based on the analysis of the at least one updated output file. In an example, the event logs are used to identify the spark configuration and associated metadata. The identified metadata includes Spark environment details, version details of the Spark environment, and configuration of the master and worker nodes in the Spark computing environment. Next, the method includes recommending, by the at least one processor 104, the at least one identified configuration for the execution of the at least one updated output file. In an example, the recommendation of the at least one configuration is associated with the memory and the number of cores required to be allocated in the master and worker nodes in the distributed computing environment for optimized configuration and performance. Thereafter, the method includes executing, by the at least one processor 104, the at least one updated output file using the at least one identified configuration.

In another exemplary embodiment, the method includes storing the recommended configuration of the computational resources in the database for future analysis, and to further train the model.

Figure 5:
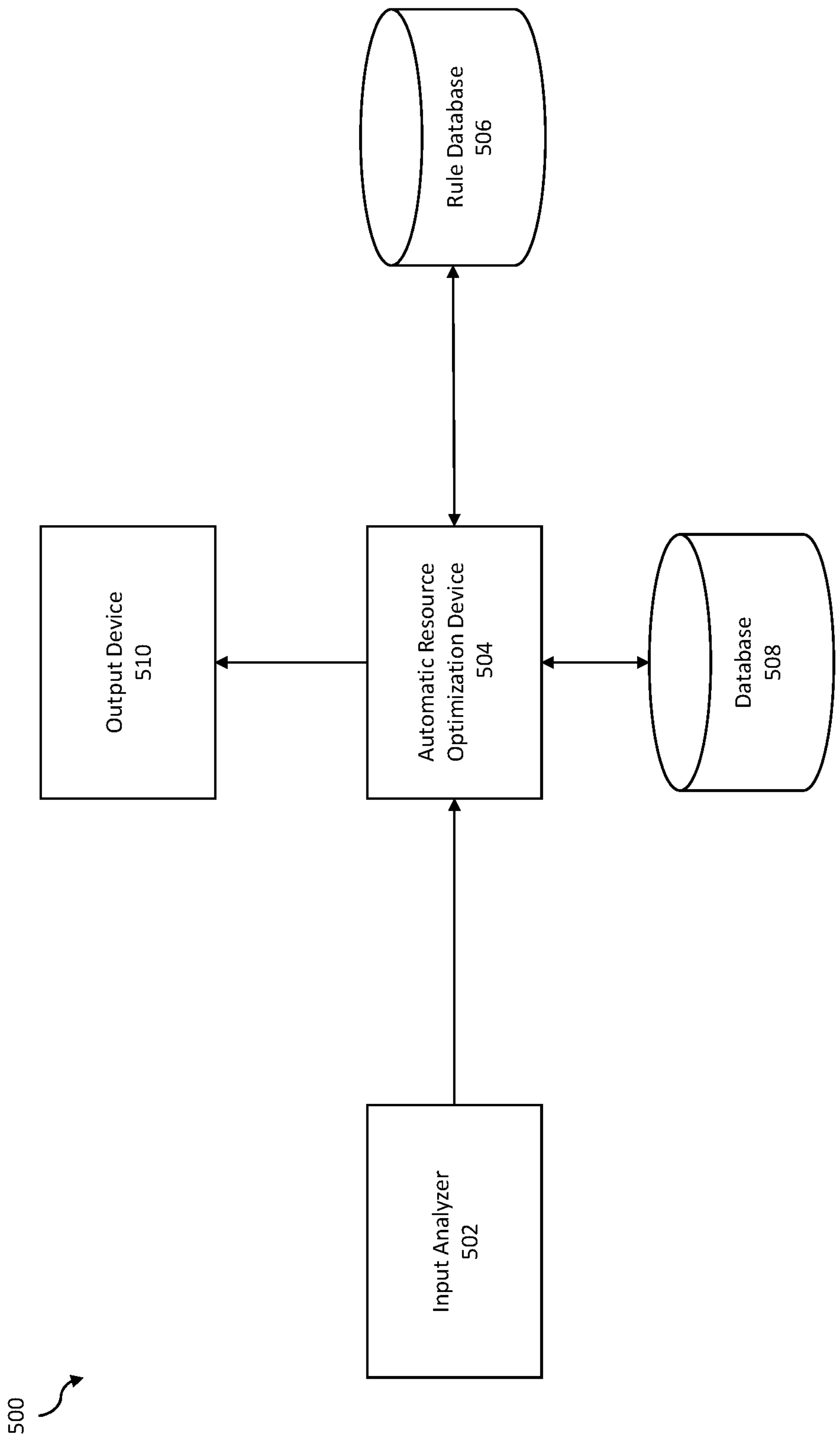
FIG. 5 illustrates a process flow diagram usable for implementing a method for optimizing at least one resource requirement on a distributed processing platform in accordance with an exemplary embodiment.

FIG. 5 illustrates a process flow diagram usable for implementing a method for optimizing at least one resource requirement on a distributed processing platform in accordance with an exemplary embodiment. As illustrated in FIG. 5, the process flow 500 begins with receiving at least one text file based on a user input. In an embodiment, the at least one text file may be an Apache Spark code. The at least one text file may be analyzed using an input analyzer 502 that generates an explain plan based on the received at least one text file. The input analyzer is a processing device that is configured to generate the explain plan associated with the Apache Spark code and to convert the at least one text file into an output file. Next, at least one operator is identified in the output file using an Automatic Resource Optimization (ARO) device 504. The ARO device then retrieves at least one rule associated with the at least one identified operator from at least one rule database 506 and applies the retrieved rule to the at least one identified operator. The ARO device is further capable of providing recommendations based on scanning of the applied at least one rule. The recommendations may be used for optimizing the output file containing the explain plan. The ARO device thereafter generates an updated output file after applying the at least one recommendation rule. The contents of the updated output file in an exemplary embodiment contain the applied at least one rule, the one or recommendations from the ARO device, and the type of recommendations. The ARO device may be further configured to analyze the records of the database 508 and the analytics are displayed at the output device 510. The analytics performed are displayed in the form of tabular and graphical representations.

Next, the updated output file may be used in the post-execution stage for configuration optimization of the distributed processing platform. In an example, the event logs associated with the at least one updated output file may be analyzed to identify at least one configuration associated with the distributed processing platform. The ARO device recommends an optimum configuration of computational resources on the distributed processing platform. The recommended configurations are also stored in the database 508 and are analyzed by the ARO device. The results of the analytics may be displayed using the output device 510.

In an example, the updated output file includes the optimized Apache Spark code for avoiding performance issues in the distributed computing environment. The system further recommends the optimum configuration of computational resources for distributed computing.

Accordingly, with this technology, the process for optimizing resource requirements on the distributed processing platform is disclosed. As evident from the above disclosure, the present solution provides significant technical advancement over the existing solutions by ensuring optimum utilization of computational resources and preventing performance issues in the distributed computing environment using trained models. The use of present technology ensures optimum performance in the distributed computing environment by reducing manual dependency or manual intervention and anticipating the computational resources required and the associated optimum configuration of the master node and worker nodes. Therefore, as disclosed in the present disclosure, the method and system for optimizing at least one resource requirement on the distributed processing platform help in reducing communication overheads, reducing dependency on human intervention in predicting the resource requirements and optimum configuration, avoiding operational challenges associated with excessive data shuffles, memory leakages, and misconfiguration of computational resources in a distributed computing environment.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for optimizing at least one resource requirement on a distributed processing platform is disclosed. The instructions include executable code which, when executed by a processor, may cause the processor to receive, via a communication interface, at least one text file based on a user input; generate an output file based on the at least one text file, wherein the output file comprises an explain plan associated with the at least one text file; identify at least one operator in the output file; apply at least one rule to the at least one operator, wherein the at least one rule for the at least one operator is retrieved from at least one rule database; scan the at least one rule that is applied to the at least one operator; recommend at least one change in the at least one rule based on the scan of the at least one rule; and generate at least one updated output file based on the recommendation of the at least one change in the at least one rule.

In an embodiment, each of the at least one text file includes a Spark code received based on the user input. The at least one rule database includes a plurality of rules defined for a plurality of operators. The at least one change in the at least one rule is recommended for an optimal execution of the received text file. The executable code when executed causes the processor to store the at least one updated output file in a database. To execute the at least one updated output file, the executable code when executed causes the processor to analyze, using the trained model, the at least one updated output file; identify at least one configuration associated with the distributed processing platform based on the analysis of the at least one updated output file; recommend the at least one identified configuration for the execution of the at least one updated output file; and execute the at least one updated output file using the at least one identified configuration.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for optimizing at least one resource requirement on a distributed processing platform, the method being implemented by at least one processor, the method comprising:

receiving, by the at least one processor via a communication interface, at least one text file based on a user input;

generating, by the at least one processor, an output file based on the at least one text file, wherein the output file comprises an explain plan associated with the at least one text file;

identifying, by the at least one processor using a trained model, at least one operator in the output file;

applying, by the at least one processor, at least one rule to the at least one operator, wherein the at least one rule for the at least one operator is retrieved from at least one rule database;

scanning, by the at least one processor, the at least one rule that is applied to the at least one operator;

recommending, by the at least one processor using the trained model, at least one change in the at least one rule based on the scanning of the at least one rule; and generating, by the at least one processor, at least one updated output file based on the recommendation of the at least one change in the at least one rule, wherein the method further comprises executing the at least one updated output file by:

analyzing, by the at least one processor using the trained model, the at least one updated output file;

identifying, by the at least one processor, at least one configuration associated with the distributed processing platform based on the analysis of the at least one updated output file;

recommending, by the at least one processor, the at least one identified configuration for the execution of the at least one updated output file; and executing, by the at least one processor, the at least one updated output file using the at least one identified configuration, wherein the recommending of the at least one identified configuration for the execution of the at least one updated output file is associated with a memory and a number of cores required to be allocated in master and worker nodes in the distributed processing platform for optimized performance with respect to excessive data shuffles, memory leakages, and misconfigurations, and wherein the method further comprises further training the trained model by using the at least one identified configuration.

2. The method as claimed in claim 1, wherein each of the at least one text file comprises a Spark code.

3. The method as claimed in claim 1, wherein the at least one rule database comprises a plurality of rules defined for a plurality of operators.

4. The method as claimed in claim 1, wherein the at least one change in the at least one rule is recommended for an optimal execution of the received at least one text file.

5. The method as claimed in claim 1, further comprising storing, by the at least one processor, the at least one updated output file in a database.

6. A computing device configured to implement an execution of a method for optimizing at least one resource requirement on a distributed processing platform, the computing device comprising:

a processor;

a memory; and a communication interface coupled to each of the processor and the memory, wherein the processor is configured to:

receive, via the communication interface, at least one text file based on a user input;

generate an output file based on the at least one text file, wherein the output file comprises an explain plan associated with the at least one text file;

identify, using a trained model, at least one operator in the output file;

apply at least one rule to the at least one operator, wherein the at least one rule for the at least one operator is retrieved from at least one rule database;

scan the at least one rule that is applied to the at least one operator;

recommend, using the trained model, at least one change in the at least one rule based on the scan of the at least one rule; and generate at least one updated output file based on the recommendation of the at least one change in the at least one rule, wherein the processor is further configured to execute the at least one updated output file by:

analyzing, using the trained model, the at least one updated output file;

identifying at least one configuration associated with the distributed processing platform based on the analysis of the at least one updated output file;

recommending the at least one identified configuration for the execution of the at least one updated output file; and executing the at least one updated output file using the at least one identified configuration, wherein the recommending of the at least one identified configuration for the execution of the at least one updated output file is associated with a memory and a number of cores required to be allocated in master and worker nodes in the distributed processing platform for optimized performance with respect to excessive data shuffles, memory leakages, and misconfigurations, and wherein the processor is further configured to further train the trained model by using the at least one identified configuration.

7. The computing device as claimed in claim 6, wherein each of the at least one text file comprises a Spark code.

8. The computing device as claimed in claim 6, wherein the at least one rule database comprises a plurality of rules defined for a plurality of operators.

9. The computing device as claimed in claim 6, wherein the at least one change in the at least one rule is recommended for an optimal execution of the received at least one text file.

10. The computing device as claimed in claim 6, wherein the processor is further configured to store the at least one updated output file in a database.

11. A non-transitory computer readable storage medium storing instructions for optimizing at least one resource requirement on a distributed processing platform, the instructions comprising executable code which, when executed by a processor, causes the processor to:

receive at least one text file based on a user input;

generate an output file based on the at least one text file, wherein the output file comprises an explain plan associated with the at least one text file;

identify, using a trained model, at least one operator in the output file;

apply at least one rule to the at least one operator, wherein the at least one rule for the at least one operator is retrieved from at least one rule database;

scan the at least one rule that is applied to the at least one operator;

recommend, using the trained model, at least one change in the at least one rule based on the scan of the at least one rule; and generate at least one updated output file based on the recommendation of the at least one change in the at least one rule, wherein when executed by the processor, the executable code further causes the processor to execute the at least one updated output file by:

analyzing, using the trained model, the at least one updated output file;

identifying at least one configuration associated with the distributed processing platform based on the analysis of the at least one updated output file;

recommending the at least one identified configuration for the execution of the at least one updated output file; and executing the at least one updated output file using the at least one identified configuration, wherein the recommending of the at least one identified configuration for the execution of the at least one updated output file is associated with a memory and a number of cores required to be allocated in master and worker nodes in the distributed processing platform for optimized performance with respect to excessive data shuffles, memory leakages, and misconfigurations, and wherein when executed by the processor, the executable code further causes the processor to further train the trained model by using the at least one identified configuration.

12. The storage medium as claimed in claim 11, wherein each of the at least one text file comprises a Spark code.

13. The storage medium as claimed in claim 11, wherein the at least one rule database comprises a plurality of rules defined for a plurality of operators.

14. The storage medium as claimed in claim 11, wherein the at least one change in the at least one rule is recommended for an optimal execution of the received at least one text file.

15. The storage medium as claimed in claim 11, wherein when executed by the processor, the executable code further causes the processor to store the at least one updated output file in a database.

* * * * *